(12) United States Patent
Zollinger et al.

(10) Patent No.: US 8,612,771 B2
(45) Date of Patent: Dec. 17, 2013

(54) VERIFYING AUTHENTICITY OF PLAYBACK DEVICE

(75) Inventors: Mitch Zollinger, San Jose, CA (US); Filip Paun, Menlo Park, CA (US); Scott G. Kelly, Santa Clara, CA (US)

(73) Assignee: Netflix, Inc., Los Gatos, CA (US)

( * ) Notice: Subject to any disclaimer, the term of this patent is extended or adjusted under 35 U.S.C. 154(b) by 16 days.

(21) Appl. No.: 13/345,586

(22) Filed: Jan. 6, 2012

(65) Prior Publication Data

US 2013/0179695 A1    Jul. 11, 2013

(51) Int. Cl.
*H04L 9/28* (2006.01)

(52) U.S. Cl.
USPC ......................................................... 713/189

(58) Field of Classification Search
USPC ......................................................... 713/189
See application file for complete search history.

(56) References Cited

U.S. PATENT DOCUMENTS

| 8,347,404 | B2 * | 1/2013 | Lee et al. ......................... 726/29 |
| 2003/0016827 | A1 * | 1/2003 | Asano et al. ................. 380/277 |
| 2010/0262831 | A1 * | 10/2010 | Cheng et al. ................. 713/176 |

* cited by examiner

*Primary Examiner* — Matthew Smithers
(74) *Attorney, Agent, or Firm* — Patterson & Sheridan, LLP

(57) ABSTRACT

One embodiment of the invention sets forth a mechanism for verifying the authenticity of a device before transmitting digital content to the device. In operation, the device stores a device key that is generated at manufacture-time using a pre-determined cryptographic key and the device identifier. In operation, the device generates a proof of possession from the application data and the stored device key. When verifying the device authenticity, a device key is derived from the master key and the device identifier then a proof of possession is derived from the derived device key and the application data obtained from the device. If the derived proof of possession matches the received proof of possession, then the authenticity of the device can be verified.

20 Claims, 4 Drawing Sheets

VERIFYING AUTHENTICITY OF PLAYBACK DEVICE

BACKGROUND OF THE INVENTION

1. Field of the Invention

The present invention relates generally to online content distribution and, more specifically, to verifying the authenticity of a device.

2. Description of the Related Art

Conventional digital content distribution systems include a content server, an application server, a content player, and a communications network connecting the content server to the content player. The content server is configured to store digital content items corresponding to different content titles that can be downloaded from the content server to the content player. The application server allows a user of the content player to browse through available digital content and manage account information, etc.

Before content can be played within the content player, the authenticity of the device on which the content player executes needs to be verified. Typically, a cryptographic key per device or per device model provided by the device manufacturer is stored in a storage component accessible by the application server and by the device itself. When the content player requests digital content for playback, the application verifies the authenticity of the device by matching a cryptographic proof of possession created by the corresponding key retrieved from the storage component and the key used by the device.

There are two main drawbacks to this approach. First, storing and maintaining a unique a key per device on the application server is extremely inefficient from a key management perspective. Second, in a scenario where multiple devices share the same device model key, if the key of a single device is compromised, i.e., illegally retrieved from the device, then the security of all other devices sharing that key is also compromised. In such a scenario, those devices cannot securely be authenticated.

As the foregoing illustrates, what is needed in the art is a mechanism for verifying the authenticity of the playback device using a simple key management mechanism and without storing the same master cryptographic key on all devices of a given model.

SUMMARY OF THE INVENTION

One embodiment of the invention sets forth a method for a computer-implemented method for verifying the authenticity of a device. The method includes the steps of requesting from the device a device identifier, application data and a proof of possession that is derived from the device key and the application data, receiving the device identifier, application data and the proof of possession from the device, generating via a cryptographic algorithm a derived key from the device identifier and the master key, generating via a cryptographic algorithm a derived proof of possession based on the application data received from the device and the derived device key, determining whether the derived proof of possession matches the received proof of possession, and if the derived proof of possession matches the received proof of possession, then verifying the authenticity of the device, or if the derived proof of possession does not match the received proof of possession, then not verifying the authenticity of the device. Advantageously, because the device only stores the device key and not the master key, a compromise of the device key does not compromise all the devices that share the same master key.

Further, because the device key can be derived from the master key, the device verification module 208 only needs to access the original master key and does not need to store and maintain a key per device.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
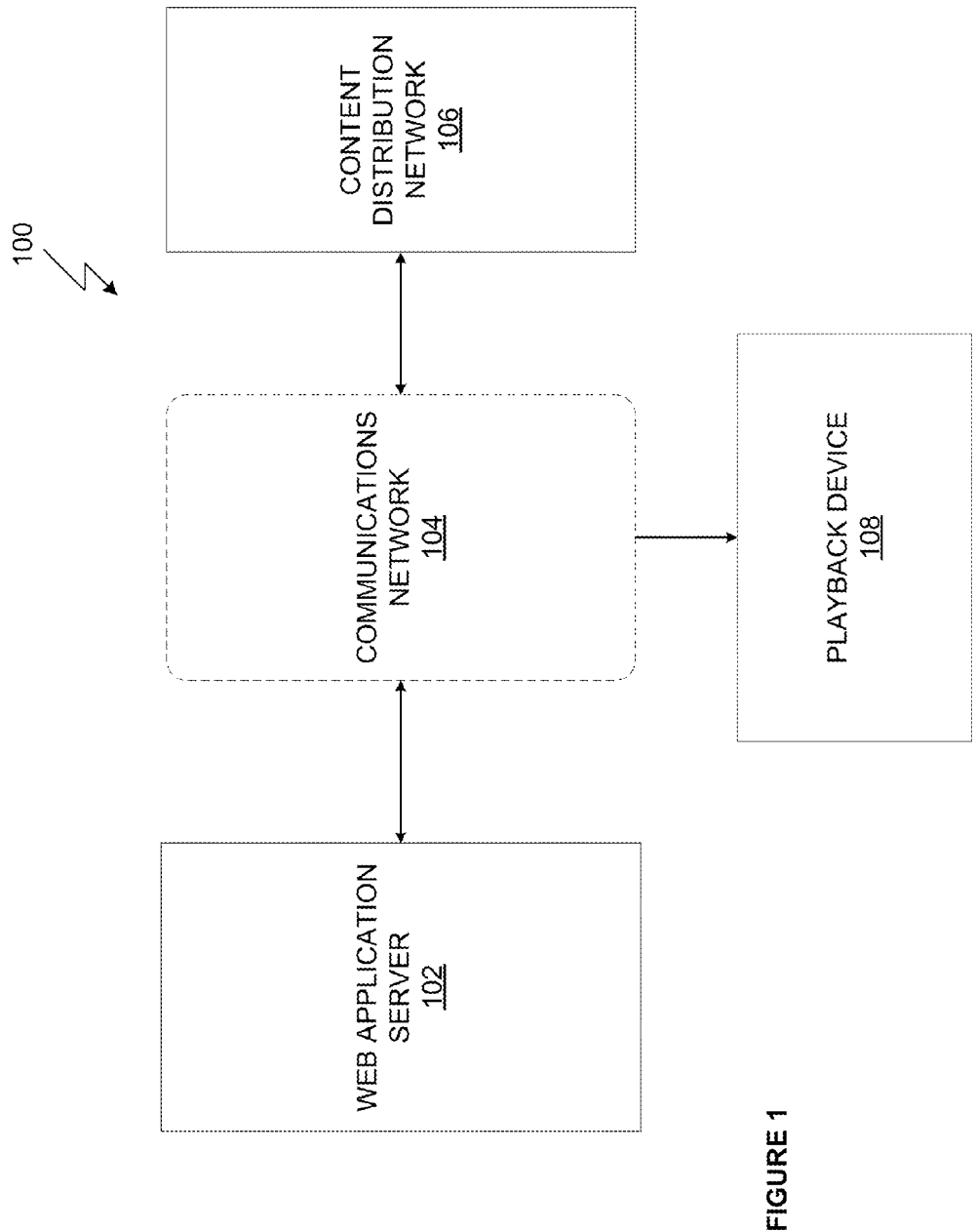
FIG. 1 illustrates a content browsing and distribution system configured to implement one or more aspects of the invention.

FIG. 1 illustrates a content browsing and distribution system 100 configured to implement one or more aspects of the invention. As shown, the content browsing and distribution system 100 includes a web application server 102, a communications network 104, a content distribution network (CDN) 106 and a playback device 108.

The communications network 104 includes a plurality of network communications systems, such as routers and switches, configured to facilitate data communication between the web application server 102, the CDN 106 and the playback device 108. Persons skilled in the art will recognize that many technically feasible techniques exist for building the communications network 104, including technologies practiced in deploying the well-known internet communications network.

The web application server 102 is a computer system configured to host a web application that is accessed by the playback device 108. The web application hosted by the web application server 102 allows a user of playback device 108 to browse through available digital content, manage account information, receive content recommendations, etc.

The CDN 106 comprises one or more computer systems configured to serve download requests for digital media (referred to "digital content items" herein) received from the playback device 108. The digital content items may reside on a mass storage system accessible to the computer system. The mass storage system may include, without limitation, direct attached storage, network attached file storage, or network attached block-level storage. The digital content items may be formatted and stored on the mass storage system using any technically feasible technique. A data transfer protocol, such as the well-known hyper-text transfer protocol (HTTP), may be used to download digital content items from the content server 106 to the playback device 108.

The playback device 108 may comprise a computer system, a set top box, a mobile device such as a mobile phone, or any other technically feasible computing platform that has network connectivity and is coupled to or includes a display device and speaker device for presenting video frames, and generating acoustic output, respectively. The playback device 108 interacts with the web application server 102 and the CDN 106 to display available digital content to a user.

Although, in the above description, the content browsing and distribution system 100 is shown with one playback device 108 and one CDN 106, persons skilled in the art will recognize that the architecture of FIG. 1 contemplates only an exemplary embodiment of the invention. Other embodiments may include any number of content browser and players 108 and/or CDNs 106. Thus, FIG. 1 is in no way intended to limit the scope of the present invention in any way.

Figure 2A:
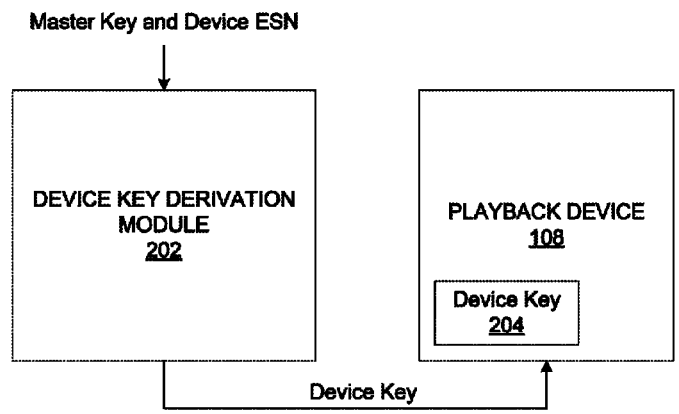
FIG. 2A is an illustration of a device key derivation module that generates a device key for the playback device of FIG. 1, according to one embodiment of the invention.

FIG. 2A is an illustration of a device key derivation module 202 that generates a device key 204 for the playback device 108 of FIG. 1, according to one embodiment of the invention.

The device key derivation module 202 generates a unique cryptographic key associated with the playback device 108 (referred to herein as the "device key"). In operation, at manufacture time, a unique device identification associated with the playback device 108, such as the electronic serial number (ESN), and a pre-determined cryptographic key are input into the device key derivation module 202. The device key derivation module 202 then applies a cryptographic algorithm to the inputs to generate the device key 204. The device key 204 is transmitted to the playback device 108 and is stored within a memory, for example the read-only memory, of the playback device 108.

In one embodiment, the device key derivation module 202 first applies a hash function, such as Secure Hash Algorithm (SHA), to the unique device identification and then generates the device key by applying a symmetric key algorithm, such as Advanced Encryption Standard (AES) algorithm or a Triple Data Encryption Standard (DES) algorithm, to the hashed unique device identification and the pre-determined cryptographic master key. Persons skilled in the art would readily recognize that any hash function and symmetric algorithm that is configurable to generate keying material using a unique identifier and a cryptographic master key is within the scope of this invention.

Figure 2B:
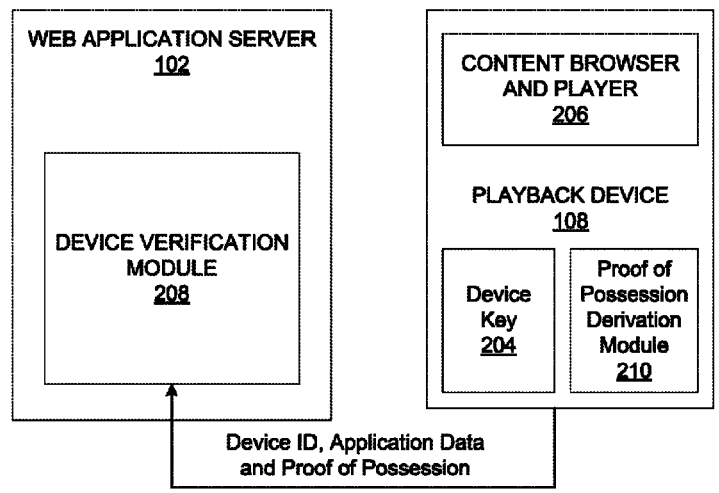
FIG. 2B is an illustration of a device verification module within the web application server of FIG. 1 that verifies the authenticity of the playback device 108 of FIG. 1, according to one embodiment of the invention.

FIG. 2B is an illustration of a device verification module 208 within the web application server 102 of FIG. 1 that verifies the authenticity of the playback device 108 of FIG. 1, according to one embodiment of the invention. As shown, the playback device 108 includes a content browser and player 206, the device key 204 and the proof of possession derivation module 210.

The content browser and player 206 is a software application that interacts with the web application server 102 and the CDN 106 to display available digital content information, gather user preferences and play digital content items to a user. In operation, before the content browser and player 206 can play a digital content item, the authenticity of the playback device 108 needs to be verified. In one embodiment, each digital content item is associated with a digital rights management (DRM) key and, before the DRM key associated with a particular digital content item can be transmitted to the content browser and player 206, the authenticity of the playback device 108 needs to be verified.

The proof of possession derivation module 210 generates a proof of possession message (referred to herein as the "proof of possession") based on the device key and application data generated by the playback device 108. In one embodiment, the application data is defined according to a pre-determined protocol that is understood by the device verification module 208 within the web application server 102. The proof of possession is generated by applying a cryptographic algorithm to the device key and the application data. In one embodiment, the cryptographic algorithm is a hash based message authentication code (HMAC). In other embodiments, any type of message authentication code (MAC) that is configurable to generate a proof of possession from application data using the device key is within the scope of this invention.

The device verification module 208 included in the web application server 102 verifies the authenticity of the playback device 108. In operation, the device verification module 208 ensures that the device key 204 stored within the playback device 108 has been derived from the device identifier and an original master key that is accessible to the device verification module 208. More specifically, the device verification module 208 requests the content browser and player 206 to authenticate the playback device 108. In response, the content browser and player 206 transmits the device identification, the application data and the proof of possession to the device verification module 208. Upon receiving the device identification, the application data and the proof of possession, the device verification module 208 retrieves the master key and applies a cryptographic algorithm to the device identification to derive the device key. The cryptographic algorithm applied by the device verification module 208 is the same as the cryptographic algorithm applied by the device key derivation module 202 in FIG. 2A. The device verification module 208 also applies a cryptographic algorithm to the derived device key and the application data obtained from the playback device 108 to generate a derived proof of possession. The cryptographic algorithm applied by the device verification module 208 is the same as the cryptographic algorithm applied by the proof of possession derivation module 210 described above.

The device verification module 208 then matches the derived proof of possession with the proof of possession received from the playback device 108. If the derived proof of possession and the proof of possession provided by the device match, then the authenticity of the playback device 108 is verified. When the authenticity of the playback device 108 is verified, the content browser and player is allowed to play digital content items. If, however, the derived proof of possession and the device created proof of possession do not match, then the authenticity of the playback device 108 cannot be verified. When the authenticity of the playback device 108 is not verified, the content browser and player is not allowed to play digital content items.

In one embodiment, the master key and the cryptographic algorithm to be used by the device key derivation module 202 are provided to the manufacturer of the playback device 108 by the manufacturer of the content browser and player 206. In such an embodiment, the master key and the cryptographic algorithm are provided to the manufacturer via a secure mechanism, such as a secure token, secure universal serial bus (USB) key or a smart card.

Although, in the above description, the authenticity verification techniques are described in the context of a playback device being verified by a content distribution server, persons skilled in will recognize that the techniques herein can be applied to any device whose identify needs to be verified. Thus, FIGS. 2A and 2B are in no way intended to limit the scope of the present invention in any way.

Figure 3A:
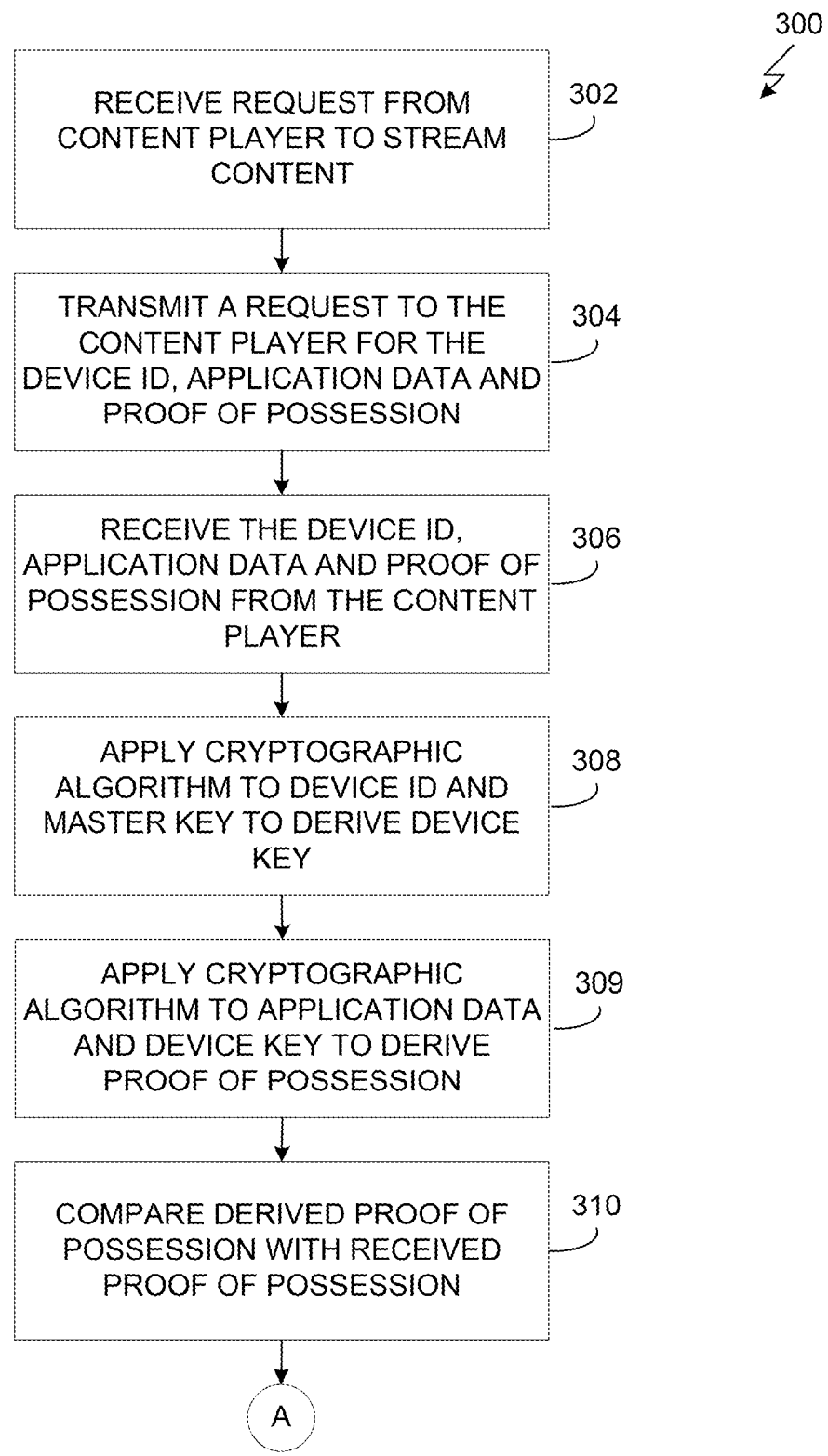
FIGS. 3A and 3B set forth a flow diagram of method steps for verifying the authenticity of a playback device, according to one embodiment of the invention.
Figure 3B:
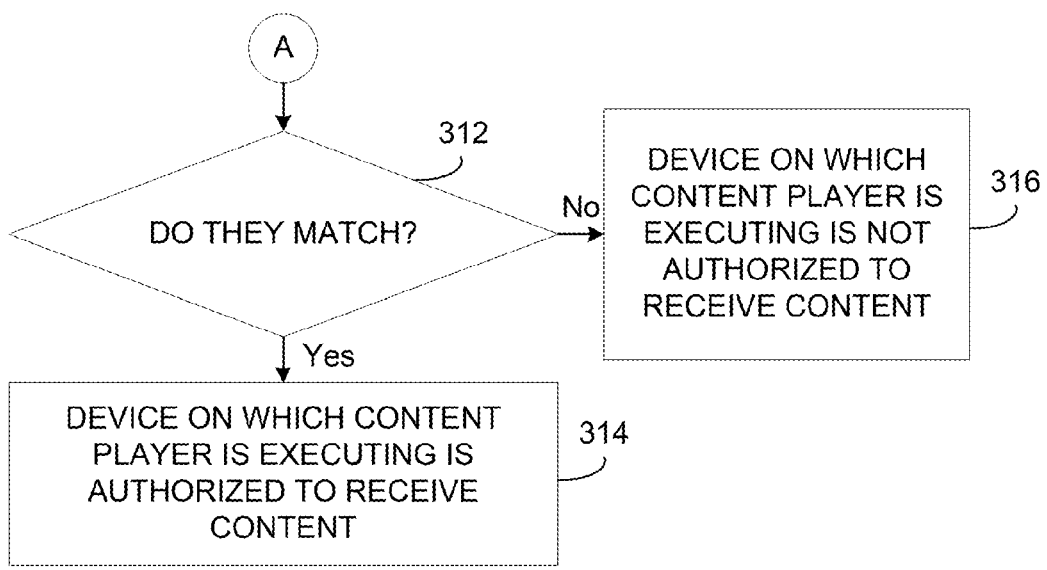

FIGS. 3A and 3B set forth a flow diagram of method steps for verifying the authenticity of a playback device, according to one embodiment of the invention. Although the method steps are described in conjunction with the systems for FIGS.

1-2, persons skilled in the art will understand that any system configured to perform the method steps, in any order, is within the scope of the invention.

The method 300 begins at step 302, where the web application server 102 receives a request from the content browser and player 206 to stream a particular digital content item. Again, before the content browser and player 206 can play such a digital content item, the authenticity of the playback device 108 needs to be verified. At step 304, the device verification module 208 transmits a request to the content browser and player 206 for the unique device identification, the application data and the device cryptographic proof of possession associated with the playback device 108. At step 306, the device verification module 208, in response to the request, receives the unique device identification, the application data and the device proof of possession from the content browser and player 306.

At step 308, upon receiving the device identification, the application data and the device proof of possession, the device verification module 208 applies a cryptographic algorithm to the device identification and the retrieved master key to derive the device key. The cryptographic algorithm applied by the device verification module 208 is the same as the cryptographic algorithm applied by the device key derivation module 202 in FIG. 2A. At step 309, the device verification module 208, applies a cryptographic algorithm to the application data, received from the playback device 108, and the derived device key to derive the a proof of possession. Again, the cryptographic algorithm applied by the device verification module 208 is the same as the cryptographic algorithm applied by the proof of possession derivation module 210 in FIG. 2B.

At step 310, the device verification module 208 compares the derived proof of possession with the proof of possession received from the playback device 108. At step 312, if the derived proof of possession matches the device proof of possession received from the playback device 108, then the method 300 proceeds to step 314. At step 314, the authenticity of the playback device 108 is verified, the playback device 108 is authorized to receive digital content items and the content browser and player is allowed to play digital content items. If, at step 312, if the derived proof of possession does not match the proof of possession received from the playback device 108, then the method 300 proceeds to step 316. At step 316, the authenticity of the playback device 108 cannot be verified, the playback device 108 is not authorized to received digital content items and the content browser and player is not allowed to play digital content items.

Advantageously, because the device only stores the device key and not the master key, a compromise of the device key does not compromise all the devices that share the same master key. Further, because the device key can be derived from the device identification with the master key, the device verification module 208 only needs the device identification and access the original master key, and does not need to store and maintain a key per device.

While the foregoing is directed to embodiments of the present invention, other and further embodiments of the present invention may be devised without departing from the basic scope thereof. For example, aspects of the present invention may be implemented in hardware or software or in a combination of hardware and software. One embodiment of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A computer-implemented method for verifying the authenticity of a device, the method comprising:
   requesting from the device a device identifier, application data and a proof of possession that is derived from a device key and the application data;
   receiving the device identifier, application data and the proof of possession from the device;
   generating via a first cryptographic algorithm a derived device key based on the device identifier and a master key;
   generating via a second cryptographic algorithm a derived proof of possession based on the application data received from the device and the derived device key;
   determining whether the derived proof of possession matches the received proof of possession; and
   if the derived proof of possession matches the received proof of possession, then verifying the authenticity of the device, or
   if the derived proof of possession does not match the received proof of possession, then not verifying the authenticity of the device.

2. The method of claim 1, further comprising, if the derived proof of possession matches the obtained device proof of possession, then transmitting content to the device for playback.

3. The method of claim 1, further comprising, if the derived proof of possession matches the received proof of possession, then transmitting a digital rights management license associated with content to be played on the device to the device.

4. The method of claim 1, further comprising, if the derived proof of possession does not match the received proof of possession, then denying the device access to content for playback.

5. The method of claim 1, wherein the manufacturer derives the device key by applying the first cryptographic algorithm to the device identification and the master key, and wherein the device key is stored on the device by the manufacturer.

6. The method of claim 1, wherein generating the derived device key comprises applying a hash function to the unique identification to generate a hash value.

7. The method of claim 6, further comprising applying a keying algorithm to the hash value and the master key to generate the derived device key.

8. The method of claim 1, wherein the master key is transmitted to the manufacturer via a secure mechanism.

9. A non-transitory computer readable medium storing instructions that, when executed by a processor, cause the processor to verify the authenticity of a device, by performing the steps of:

requesting from the device a device identifier, application data and a proof of possession that is derived from a device key and the application data;

receiving the device identifier, application data and the proof of possession from the device;

generating via a first cryptographic algorithm a derived device key based on the device identifier and a master key;

generating via a second cryptographic algorithm a derived proof of possession based on the application data received from the device and the derived device key;

determining whether the derived proof of possession matches the received proof of possession; and if the derived proof of possession matches the received proof of possession, then verifying the authenticity of the device, or if the derived proof of possession does not match the received proof of possession, then not verifying the authenticity of the device.

10. The computer readable medium of claim 9, further comprising, if the derived proof of possession matches the obtained device proof of possession, then transmitting content to the device for playback.

11. The computer readable medium of claim 9, further comprising, if the derived proof of possession matches the received proof of possession, then transmitting a digital rights management license associated with content to be played on the device to the device.

12. The computer readable medium of claim 9, further comprising, if the derived proof of possession does not match the received proof of possession, then denying the device access to content for playback.

13. The computer readable medium of claim 9, wherein the manufacturer derives the device key by applying the first cryptographic algorithm to the device identification and the master key, and wherein the device key is stored on the device by the manufacturer.

14. The computer readable medium of claim 9, wherein generating the derived device key comprises applying a hash function to the unique identification to generate a hash value.

15. The computer readable medium of claim 14, further comprising applying a keying algorithm to the hash value and the master key to generate the derived device key.

16. The computer readable medium of claim 9, wherein the master key is transmitted to the manufacturer via a secure mechanism.

17. A computer system, comprising:

a secure memory that stores a master key; and a processor configured to:

request from a device a device identifier, application data and a proof of possession that is derived from a device key and the application data, receive the device identifier, application data and the proof of possession from the device, generate via a first cryptographic algorithm a derived device key based on the device identifier and the master key, generate via a second cryptographic algorithm a derived proof of possession based on the application data received from the device and the derived device key, determine whether the derived proof of possession matches the received proof of possession, and if the derived proof of possession matches the received proof of possession, then verify the authenticity of the device, or if the derived proof of possession does not match the received proof of possession, then not verify the authenticity of the device.

18. The computer system of claim 17, wherein the processor is further configured to, if the derived proof of possession matches the obtained device proof of possession, then transmitting content to the device for playback.

19. The computer system of claim 17, wherein the processor is further configured to, if the derived proof of possession matches the received proof of possession, then transmitting a digital rights management license associated with content to be played on the device to the device.

20. The computer system of claim 17, wherein the processor is further configured to, if the derived proof of possession does not match the received proof of possession, then denying the device access to content for playback.

* * * * *